（12) United States Patent
Binkley (10) Patent No.: US 9,586,160 B2
(45) Date of Patent: Mar. 7, 2017

(54) FLUID DISPERSION UNIT WITH DIRECTIONAL COMPONENT VECTOR

(71) Applicant: GTC Technology US LLC, Houston, TX (US)

(72) Inventor: Michael J. Binkley, Glenn Heights, TX (US)

(73) Assignee: GTC Technology US LLC, Houston, TX (US)

( * ) Notice: Subject to any disclaimer, the term of this patent is extended or adjusted under 35 U.S.C. 154(b) by 75 days.

(21) Appl. No.: 14/466,670

(22) Filed: Aug. 22, 2014

(65) Prior Publication Data

US 2014/0361451 A1  Dec. 11, 2014

Related U.S. Application Data

(63) Continuation of application No. 13/951,159, filed on Jul. 25, 2013, now Pat. No. 8,876,088, which is a continuation of application No. 12/408,333, filed on Mar. 20, 2009, now Pat. No. 8,517,354.

(60) Provisional application No. 61/038,067, filed on Mar. 20, 2008.

(51) Int. Cl.
*B01F 3/04* (2006.01)
*B01D 3/32* (2006.01)
*B01D 3/16* (2006.01)

(52) U.S. Cl.
CPC ............. *B01D 3/324* (2013.01); *B01D 3/163* (2013.01); *B01F 3/04751* (2013.01)

(58) Field of Classification Search
CPC ...... B01F 3/04751; B01D 3/163; B01D 3/324

USPC .................................................. 261/114.4
See application file for complete search history.

(56) References Cited

U.S. PATENT DOCUMENTS

| | | |
|---|---|---|
| 1,027,874 A | 5/1912 | Mason |
| 2,582,826 A | 1/1952 | Glitsch |
| 2,611,457 A | 9/1952 | Glitsch |
| 2,718,901 A | 9/1955 | Nutter |
| 2,752,139 A | 6/1956 | Huggins |
| 2,752,229 A | 6/1956 | Brown et al. |
| 2,787,453 A | 4/1957 | Hibshman et al. |
| 2,853,281 A | 9/1958 | Hibshman et al. |
| 2,903,251 A | 9/1959 | Thrift |
| 2,951,691 A | 9/1960 | Nutter |

(Continued)

FOREIGN PATENT DOCUMENTS

EP    010877 B1    3/1983

OTHER PUBLICATIONS

Glitsch, Inc., "Ballast Tray Design Manuel", Bulletin 4900, Sixth Edition, 1993, (40 pages).

(Continued)

*Primary Examiner* — Charles Bushey
(74) *Attorney, Agent, or Firm* — Winstead PC (57) ABSTRACT

A valve-tray assembly and method for lighter fluid heavier fluid contact towers. The active area of the tray is constructed with valves having multiple lighter fluid discharge areas facilitating improved mass transfer efficiency. The valves include first and second support legs oriented in line with the heavier fluid flow with both legs and the valve top constructed with apertures wherein the heavier fluid may flow into engagement with the lighter fluid passing from beneath the tray up, through and out of the valve.

7 Claims, 6 Drawing Sheets

(56) References Cited

U.S. PATENT DOCUMENTS

| | | |
|---|---|---|
| 3,039,751 A | 6/1962 | Versluis |
| 3,048,957 A | 8/1962 | Middleton |
| 3,080,155 A | 3/1963 | Glitsch et al. |
| 3,087,711 A | 4/1963 | Glitsch |
| 3,143,482 A | 8/1964 | McLeod et al. |
| 3,146,280 A | 8/1964 | Forgrieve |
| 3,233,708 A | 2/1966 | Glitsch |
| 3,245,669 A | 4/1966 | Huggins et al. |
| 3,282,576 A | 11/1966 | Bruckert et al. |
| 3,287,004 A | 11/1966 | Nutter |
| 3,338,566 A | 8/1967 | Kittel |
| 3,399,871 A | 9/1968 | Bon |
| 3,463,464 A | 8/1969 | Nutter et al. |
| 3,729,179 A | 4/1973 | Keller |
| 3,759,494 A | 9/1973 | Axelrod et al. |
| 3,959,419 A | 5/1976 | Kitterman |
| 4,120,919 A | 10/1978 | McClain |
| 4,133,852 A | 1/1979 | DiNicolantonio et al. |
| 4,174,363 A | 11/1979 | Bruckert |
| 4,201,626 A | 5/1980 | Asdigian |
| 4,207,174 A | 6/1980 | Christman |
| 4,247,521 A | 1/1981 | Forte et al. |
| 4,275,021 A | 6/1981 | Kirkpatrick et al. |
| 4,374,786 A | 2/1983 | McClain |
| 4,499,035 A | 2/1985 | Kirkpatrick et al. |
| 4,504,426 A | 3/1985 | Chuang et al. |
| 4,519,960 A | 5/1985 | Kitterman et al. |
| 4,528,068 A | 7/1985 | Fiocco et al. |
| 4,543,218 A | 9/1985 | Bardo et al. |
| 4,543,219 A | 9/1985 | Yamato et al. |
| 4,550,000 A | 10/1985 | Bentham |
| 4,597,916 A | 7/1986 | Chen |
| 4,603,022 A | 7/1986 | Yoneda et al. |
| 4,604,247 A | 8/1986 | Chen et al. |
| 4,710,326 A | 12/1987 | Seah |
| 4,729,857 A | 3/1988 | Lee et al. |
| 4,816,191 A | 3/1989 | Berven et al. |
| 4,842,778 A | 6/1989 | Chen et al. |
| 4,855,089 A | 8/1989 | Michels |
| 4,909,967 A | 3/1990 | Binkley et al. |
| 4,933,047 A | 6/1990 | Bannon |
| 4,956,127 A | 9/1990 | Binkley et al. |
| 4,981,265 A | 1/1991 | Buhlmann |
| 5,051,214 A | 9/1991 | Chen et al. |
| 5,098,615 A | 3/1992 | Resetarits |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,465 A | 3/1993 | Petrich et al. |
| 5,192,466 A | 3/1993 | Binkley |
| 5,277,848 A | 1/1994 | Binkley et al. |
| 5,453,222 A | 9/1995 | Lee et al. |
| 5,468,425 A | 11/1995 | Nutter |
| 5,547,617 A | 8/1996 | Lee et al. |
| 5,573,714 A | 11/1996 | Monkelbaan et al. |
| 5,762,834 A | 6/1998 | Hauser et al. |
| 5,783,119 A | 7/1998 | Ulrich et al. |
| 5,895,608 A | 4/1999 | Lee et al. |
| 5,906,773 A | 5/1999 | Hausch et al. |
| 5,911,922 A | 6/1999 | Hauser et al. |
| 5,921,109 A | 7/1999 | Billingham et al. |
| 5,948,211 A | 9/1999 | Yeoman et al. |
| 6,053,484 A | 4/2000 | Fan et al. |
| 6,068,244 A | 5/2000 | Burton et al. |
| 6,089,550 A | 7/2000 | Petschauer et al. |
| 6,113,079 A | 9/2000 | Urbanski et al. |
| 6,145,816 A | 11/2000 | Chuang et al. |
| 6,224,043 B1 | 5/2001 | Fan et al. |
| 6,293,526 B1 | 9/2001 | Fischer et al. |
| 6,422,539 B1 | 7/2002 | Burton et al. |
| 6,502,806 B2 | 1/2003 | Richardson |
| 6,540,213 B2 | 4/2003 | Bachmann et al. |
| 6,568,663 B1 | 5/2003 | Xu et al. |
| 6,575,437 B2 | 6/2003 | Fischer et al. |
| 6,588,736 B1 | 7/2003 | Chuang et al. |
| 6,592,106 B1 | 7/2003 | Eaton, Jr. |
| 6,629,687 B1 | 10/2003 | Gage |
| 6,722,639 B2 | 4/2004 | Ender et al. |
| 6,736,378 B2 | 5/2004 | Colic et al. |
| 6,739,585 B1 | 5/2004 | Urbanski et al. |
| 6,755,943 B1 | 6/2004 | Mizutani et al. |
| 6,799,752 B2 | 10/2004 | Wu et al. |
| 6,962,661 B2 | 11/2005 | Northup, Jr. et al. |
| 7,045,103 B2 | 5/2006 | McDougald et al. |
| 7,052,654 B2 | 5/2006 | McDougald et al. |
| 7,078,002 B2 | 7/2006 | Van Vliet et al. |
| 7,125,004 B2 | 10/2006 | Dollie et al. |
| 7,125,005 B2 | 10/2006 | Colic et al. |
| 7,155,801 B2 | 1/2007 | Hammon et al. |
| 7,235,158 B2 | 6/2007 | Matsumoto et al. |
| 7,270,315 B2 | 9/2007 | Burton et al. |
| 7,282,118 B2 | 10/2007 | Mitsumoto et al. |
| 7,540,476 B2 | 6/2009 | Pilling et al. |
| 7,556,734 B2 | 7/2009 | Lee et al. |
| 7,712,728 B2 | 5/2010 | Kehrer |
| 7,896,039 B2 | 3/2011 | Bachmann et al. |
| 8,006,716 B2 | 8/2011 | Zhang et al. |
| 8,517,354 B1 | 8/2013 | Binkley |
| 8,720,870 B2 | 5/2014 | Pilling et al. |
| 8,876,088 B1 * | 11/2014 | Binkley ............... B01F 3/04751 261/114.4 |
| 2002/0041040 A1 | 4/2002 | Fischer et al. |
| 2003/0067085 A1 | 4/2003 | Shakur et al. |
| 2004/0037759 A1 | 2/2004 | Van Vliet et al. |
| 2004/0151643 A1 | 8/2004 | McDougald et al. |
| 2004/0182013 A1 | 9/2004 | Kehrer |
| 2007/0126134 A1 | 6/2007 | Xu et al. |
| 2007/0295591 A1 | 12/2007 | Mosler |
| 2008/0018003 A1 | 1/2008 | Pilling et al. |
| 2008/0245651 A1 | 10/2008 | Werlen et al. |
| 2008/0277260 A1 | 11/2008 | Binkley et al. |
| 2010/0288624 A1 | 11/2010 | Kim et al. |
| 2011/0278745 A1 | 11/2011 | Pilling et al. |
| 2012/0024977 A1 | 2/2012 | Buttridge et al. |
| 2012/0118399 A1 | 5/2012 | Binkley et al. |
| 2012/0211347 A1 | 8/2012 | Kim et al. |
| 2012/0300577 A1 | 11/2012 | Buttridge et al. |
| 2016/0038851 A1 * | 2/2016 | Binkley ................ B01D 3/324 137/14 |

OTHER PUBLICATIONS

Kister, Henry Z., "Distillation Design", ch. 6, pp. 265, 296, 331, 299-301, ch. 7, pp. 382-394, ch. 9, pp. 537-554, McGraw-Hill, 1992.
Axens IFP Group Technologies, "Equiflow Reactor Internals for Optimal Catalyst Utilization", Axens Process Licensing, Jun. 2006, 4 pages.
GTC Technology, "GT-BenZap Technology Licensing". Engineered to Innovate, 2009, 2 pages.
Shell, "Shell Global Solutions' Portfolio for Reactor Engineering Technology", Shell Global Solutions, 2002, 3 pages.
Young, Lee W., "International Search Report" for the International Application PCT/IB 11/02695 as mailed Apr. 17, 2012. (4 pages).
Kim, SooWoong et al., U.S. Appl. No. 13/401,601, filed Feb. 21, 2012.
Buttridge, Ian et al., U.S. Appl. No. 13/449,122, filed Apr. 17, 2012.
Binkley, Michael, U.S. Appl. No. 12/408,333, filed Mar. 30, 2009.
Buttridge, Ian G. U.S. Appl. No. 12/418,189, filed Apr. 3, 2009.
Buttridge, Ian G., U.S. Appl. No. 13/564,881, filed Aug. 2, 2012.
Binkley, Michael J., U.S. Appl. No. 13/951,159, filed Jul. 25, 2013.
Pilling Mark, et al., Mini Valve, Hydrocarbon Engineering, Apr. 2013 [3 pages].

* cited by examiner

FLUID DISPERSION UNIT WITH DIRECTIONAL COMPONENT VECTOR

CROSS-REFERENCE TO RELATED APPLICATIONS

This patent application is a continuation of U.S. patent application Ser. No. 13/951,159, filed Jul. 25, 2013 now U.S. Pat. No. 8,876,088. U.S. patent application Ser. No. 13/951,159 is a continuation of U.S. patent application Ser. No. 12/408,333, filed Mar. 20, 2009 now U.S. Pat. No. 8,517,354. U.S. patent application Ser. No. 12/408,333 claims priority from, and incorporates by reference for any purpose the entire disclosure of, U.S. Provisional Patent Application No. 61/038,067, filed Mar. 20, 2008. This patent application incorporates by reference for any purpose the entire disclosure of U.S. patent application Ser. No. 13/951,159, filed Jul. 25, 2013, U.S. patent application Ser. No. 12/408,333, filed Mar. 20, 2009, U.S. patent application Ser. No. 12/109,781, filed Apr. 25, 2008 now U.S. Pat. No. 8,540,218, and U.S. Provisional Patent Application No. 61/038,067, filed Mar. 20, 2008.

BACKGROUND OF THE INVENTION

Field of the Invention

The present invention relates to fluid-fluid contacting trays and, more particularly, but not by way of limitation, to an improved fluid dispersion device and tray assembly incorporating fixed and/or floating units having deflector tabs disposed across a tray for higher efficiency operation.

History of Related Art

It is well known to utilize distillation columns to separate selected components from a multicomponent stream. Generally, such contact columns utilize either trays, packing, or combinations thereof. In certain years the trend has been to replace so-called "bubble caps" by sieve and valve trays in most tray column designs. Valve trays remain a favorable design.

Successful fractionation in the column is dependent upon intimate contact between heavier fluids and lighter fluids. Some contact devices, such as trays, are characterized by relatively high pressure drop and relatively high fluid hold-up. One type of contact apparatus utilizes fluid in the vapor phase to contact fluid in the liquid phase and has become popular for certain applications. Another type of contact apparatus is high-efficiency packing, which is energy efficient because it has low pressure drop and low fluid hold-up. However, these very properties at times make columns equipped with structured packing difficult to operate in a stable, consistent manner. Moreover, many applications simply require the use of trays.

Trays for fractionation columns are commonly designed in two configurations: cross-flow and counter flow. The trays generally consist of a solid tray or deck having a plurality of apertures and are installed on support rings within the column. In cross-flow trays, lighter fluid ascends through the apertures and contacts heavier fluid moving across the tray, through the "active" area thereof. In this area, the heavier fluid and the lighter fluid mix and fractionation occurs. The heavier fluid is directed onto the tray by means of a vertical channel from the tray above. This channel is referred to as the Inlet Downcomer. The heavier fluid moves across the tray and exits through a similar channel referred to as the Exit Downcomer. The location of the downcomers determines the flow pattern of the heavier fluid. If there are two Inlet Downcomers and the heavier fluid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) flow rate increases. It is the active area of the tray, however, which is of critical concern.

Addressing now select flow designs, a particularly effective tray in process columns is the sieve tray. This tray is constructed with a large number of apertures formed in the bottom surface. The apertures permit the ascending lighter fluid to flow into direct engagement with the heavier fluid that is flowing across the tray from the downcomer described above. When there is sufficient lighter-fluid flow upwardly through the tray, the heavier fluid is prevented from running downwardly through the apertures (referred to as "weeping"). A small degree of weeping is normal in trays while a larger degree of weeping is detrimental to the capacity and efficiency of a tray.

Tray efficiency is also known to be improved in sieve type trays by increasing the froth height of the heavier fluid and reducing the backflow of the heavier fluid flowing across the tray. Froth is created when lighter fluid "bubbles" percolate upwardly through the heavier fluid flowing across the tray. The suspension of the lighter fluid in the heavier fluid prolongs the fluid-fluid contact which enhances the efficiency of the process. The longer the froth is maintained and the higher the froth is established, the greater the fluid-fluid retention. Higher froth requires smaller "bubbles" formed at a sufficiently slow rate. Likewise, backflow occurs beneath the froth when circulating currents of heavier fluid are established during the heavier fluid flow across the plate. This generally forms along the lateral portions thereof. These currents carry the heavier fluid back across the tray in a manner that reduces the concentration-difference driving force for mass transfer. It is the concentration-difference between the lighter fluid and the heavier fluid which enhances the effectiveness of the fluid-fluid contact.

The concentration-difference between the lighter fluid and the heavier fluid can be effected in many ways; some reducing efficiency. For example, as operating pressure increases, the heavier fluid begins to absorb lighter fluid as it moves across a tray. This is above that normally dissolved in the heavier fluid and represents much larger amounts of lighter-fluid bubbles that are commingled or "entrained" with the heavier fluid. This lighter fluid is not firmly held and is released within the downcomer, and, in fact, the majority of said lighter fluid must be released otherwise the downcomer cannot accommodate the heavier fluid/lighter fluid mixture and will flood, thus preventing successful tower operation. This phenomena is generally deemed to occur when operating pressure is such as to produce a lighter fluid density above about 1.0 lbs/cu. ft. and typically amounts to about 10 to 20% of the lighter fluid by volume. For conventional trays, as shown below, the released lighter fluid must oppose the descending frothy lighter fluid/heavier fluid mixture flowing over the weir into the downcomer. In many cases, such opposition leads to poor tower operation and premature flooding.

When a vapor comprises the lighter fluid and a liquid comprises the heavier fluid, there are specific performance issues. Certain performance and design issues are seen in the publication "Distillation Tray Fundamentals", M. J. Lockett, Cambridge University Press, 1986. Other examples are seen in several prior art patents, which include U.S. Pat. No. 3,338,566 issued to W. Kittel, U.S. Pat. No. 3,729,179 assigned to Fractionation Research, Inc., U.S. Pat. Nos.

3,282,576 and 4,275,021 assigned to Union Carbide Corporation and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating gas ascension therethrough.

U.S. Pat. No. 4,550,000 assigned to Shell Oil Company teaches an apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances in tray designs improve efficiency within the confines of prior art structures. Likewise, U.S. Pat. No. 4,543,219 assigned to Nippon Kayaku Kabushiki Kaisha of Tokyo, Japan teaches a baffle-tray tower. The operational parameters of high gas-liquid contact efficiency and the need for low pressure loss are set forth. Such references are useful in illustrating the need for high efficiency lighter fluid/heavier fluid contact in tray process towers. U.S. Pat. No. 4,504,426 issued to Karl T. Chuang et. al. and assigned to Atomic Energy of Canada Limited is yet another example of gas-liquid contacting apparatus.

Several prior patents have specifically addressed the tray design and the apertures in the active tray deck area itself. For example, U.S. Pat. No. 2,787,453, a 1957 patent, and U.S. Pat. No. 2,853,281, a 1958 patent, disclose directional tab-style fractionating trays that promote tray activity. By way of further example, U.S. Pat. No. 3,146,280 is a 1964 patent teaching a directional float valve. The gas is induced to discharge from the inclined valve in a predefined direction depending on the orientation of the valve in the tray deck. Such valve configurations are often designed for particular applications and flow characteristics. Tray valves with weighted sides and various shapes have thus found widespread acceptance in the prior art. A circular valve structure is shown in U.S. Pat. No. 3,287,004 while a rectangular valve structure is shown in U.S. Pat. No. 2,951,691. Both of these patents issuing to I. E. Nutter, teach specific aspects of gas-liquid contact flow utilizing tray valve systems. Such specialized designs are necessary because lighter fluid/heavier fluid flow problems must be considered for each application in which a tray is fed by a downcomer. The type of flow valve, its orientation, and the lighter-fluid flow apertures for lighter fluid-heavier fluid flow interaction are some of the issues addressed by the present invention.

Addressing specifically now the type of flow valve, its orientation, and the lighter-fluid flow apertures that currently are taught by the prior art. Attention is directed to two patents in which the inventors of the present application, Michael J. Binkley, is a co-inventor. U.S. Pat. Nos. 5,147,584 and 5,120,474, both teach certain valve-tray designs and contact tray assemblies and methods. In the contact tray assemblies and the valve designs, it may be seen that the individual valves whether fixed or floating, are illustrated in the drawings with solid surfaces. In other words, both the front and rear legs, as well as the top surface of the valves, whether floating or fixed, are shown to be of solid construction. Other contact-tray valve assemblies are set forth and shown in U.S. Pat. Nos. 6,145,816; 5,911,922; 5,762,834; and 6,089,550. Each of these patents further illustrate aspects of contact tray assemblies and methods as well as valve designs. Additional patents which should likewise be reviewed relative to contact trays include the following four patents in which the Applicant hereof, Michael J. Binkley, is a co-inventor and include: U.S. Pat. Nos. 5,453,222; 4,956,127; 5,106,556; and 5,192,466. The above-referenced patents and statements with regard to the related art are set forth for purposes of understanding the intricacies of the design considerations in contact-tray assembly and method configurations. It would be an advantage to provide a method of and apparatus for enhanced fluid flow manifesting increased efficiency with a valve design having a deflection tab in either a fixed or floating configuration relative to the tray for enhanced fluid interaction.

SUMMARY OF THE INVENTION

A tray valve assembly for a process column of a type wherein a first, heavier fluid flows downwardly from a downcomer onto a tray and thereacross in a first direction through which a second, lighter fluid flows upwardly therethrough for interaction and mass transfer with the heavier fluid before passing therefrom includes a plurality of tray apertures formed on a surface of the tray for facilitating the lighter fluid flow upwardly therethrough. The tray valve assembly further includes a plurality of valves disposed across the surface of the tray and mounted in association with the plurality of tray apertures formed on the surface of the tray, at least one valve in the plurality of valves having one or more valve apertures to facilitate the lighter fluid flow therefrom and one or more deflector tabs. Each of the one or more deflector tabs is disposed with one of the one or more valve apertures. The one or more deflector tabs and orientation of the at least one valve on the tray allow ascending lighter fluid to be injected into the heavier fluid passing over the one or more valve apertures for promoting directional flow of the heavier fluid therewith in at least one direction.

A method of mixing a first, heavier fluid flowing downwardly from a downcomer onto a tray and thereacross in a first direction with a second, lighter fluid flowing upwardly therethrough for interaction and mass transfer with the heavier fluid before passing therefrom, the method includes forming, on a surface of the tray, a plurality of tray apertures for facilitating the lighter fluid flow upwardly therethrough and disposing, in association with the plurality of apertures formed on the surface of the tray, a plurality of valves. The method further includes forming, on at least one valve in the plurality of valves, one or more valve apertures to facilitate the lighter fluid flow therefrom and disposing, on the at least one valve, one or more deflector tabs. Each of the one or more deflector tabs is disposed with one of the one or more valve apertures. The method additionally includes allowing, via the one or more deflector tabs and an orientation of the at least one valve on the tray, ascending lighter fluid to be injected into the heavier fluid passing over the one or more valve apertures to promote directional flow of the heavier fluid therewith in at least one direction.

A valve for use in a tray valve assembly for a process column of a type wherein a first, heavier fluid flows downwardly from a downcomer onto a tray and thereacross in a first direction through which a second, lighter fluid flows upwardly therethrough for interaction and mass transfer with the heavier fluid before passing therefrom includes a body, the body having a top surface and at least one securement leg. The valve further includes one or more valve apertures to facilitate the lighter fluid flow therefrom and one or more deflector tabs, each of the one or more deflector tabs being disposed with one of the one or more valve apertures. The one or more deflector tabs and the one or more valve apertures are adapted to allow ascending lighter fluid to be injected into the heavier fluid passing over the one or more valve apertures for promoting directional flow of the heavier fluid therewith in at least one direction.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
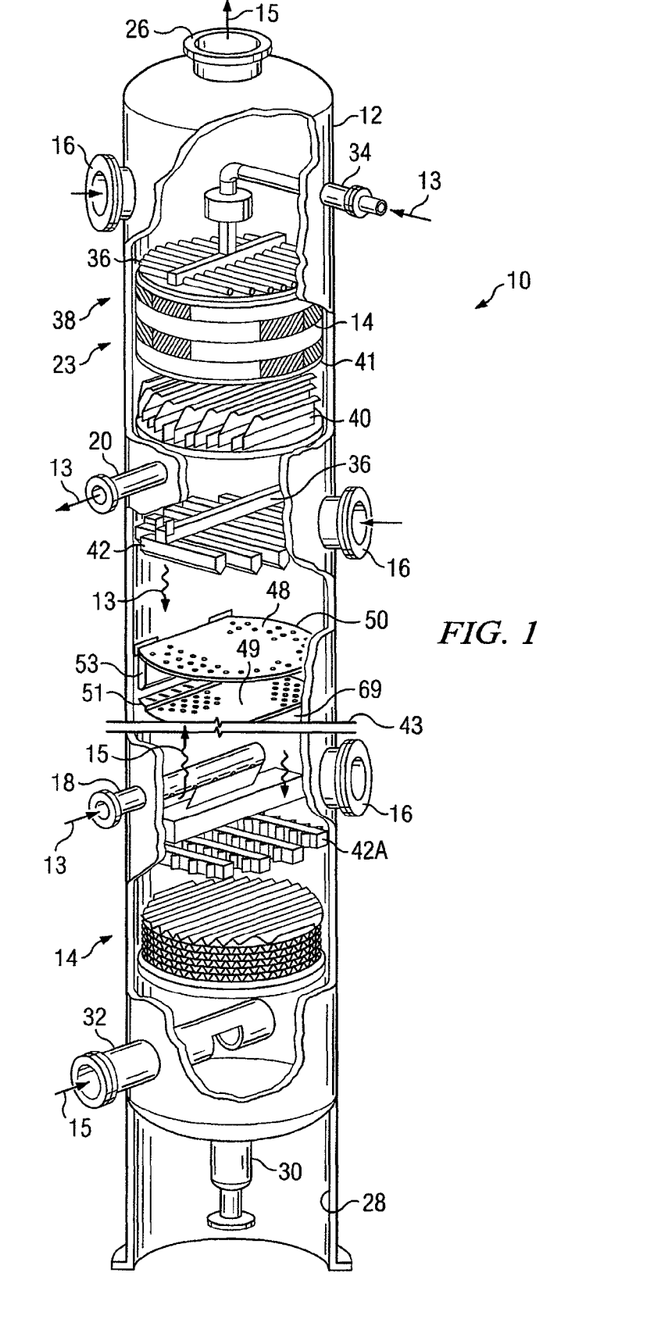
FIG. 1 illustrates a perspective view of a packed column with various sections cut away for illustrating, diagrammatically, a variety of tower in accordance with an embodiment of the present invention.

Referring first to FIG. 1, there is shown a fragmentary, perspective view of an illustrative packed exchange tower or column with various sections cut away for showing a variety of tower internals and the utilization of one embodiment of an improved high-capacity tray assembly. The exchange column 10 of FIG. 1 comprises a cylindrical tower 12 having a plurality of packing bed layers 14 and trays disposed therein. A plurality of manways 16 is likewise constructed for facilitating access to the internal region of the tower 12. Also provided are side stream draw-off line 20, heavier-fluid side feed line 18, and side stream lighter-fluid feed line or reboiler return line 32. A reflux return line 34 is provided atop the column 10.

In operation, heavier fluid 13 is fed into the column 10 through reflux return line 34 and side stream feed-input feed line 18. The heavier fluid 13 flows downwardly through the tower and ultimately leaves the tower either at side stream draw-off line 20, or at bottom-stream draw-off line 30. In the case of a vapor-liquid tower, the heavier fluid 13, during its downward flow, is depleted of some material which evaporate from it as it passes through the trays and packing beds, and is enriched or added to by material which condenses into it out of the lighter fluid stream.

Still referring to FIG. 1, the exchange column 10 is diagrammatically cut in half for purposes of clarity. In this illustration, the column 10 includes a lighter-fluid outlet in overhead line 26 disposed atop the tower 12 and a lower skirt 28 disposed in the lower region of the tower 12 around bottom stream takeoff line 30 coupled to a reboiler (not shown). Reboiler return conduit 32 is shown disposed above the skirt 28 for recycling lighter fluid therein upwardly through the trays and/or packing layers 14. Reflux from condensers is provided in the upper tower region 23 through entry conduit 34 wherein reflux is distributed throughout a distributor 36 across upper packing bed 38. It may be seen that the upper packing bed 38 is of the structured packing variety. The regions of the exchange column 10 beneath the upper packing bed 38 are shown for the purpose of illustration and include a heavier fluid collector 40 disposed beneath a support grid 41 in support of the upper structured packing 38. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Valve trays, comprising the subject matter of the present invention, are herein shown. Such trays comprise plates which are punched or slotted in construction. Within the scope of the invention and for the purposes of the description of various embodiments herein, the configuration referred to as a "valve" or "unit" includes anything at the intersection of and facilitating the dispersion contact between a lighter fluid and a heavier fluid. The lighter fluid and the heavier fluid engage at or along the tray and, in some assemblies, are permitted to flow through the same openings in a counter-current flow arrangement. Optimally, the lighter-fluid and heavier-fluid flows reach a level of stability. With the utilization of appropriate downcomers, to be described in more detail below, this stability may be achieved with a relatively low flow rate permitting the ascending lighter fluid to mix with the descending heavier fluid. In some embodiments, no downcomers are used and the lighter fluid and the heavier fluid use the same openings, alternating as the respective pressures change.

In the present embodiment, cross-flow valve trays 48 and 49 and downcomers 53 and 69 are illustrated. Tray 48 is constructed with a plurality of floating valves. Tray 49 also illustrates a raised inlet section 51 beneath downcomer 53, which is substantially planar, formed with a plurality of apertures, and which may include a series of momentum deflector barriers, as will be described below. The raised inlet area is described in more detail in U.S. Pat. No. 4,956,127 (the '127 patent). Corrosion is another consideration in designing packed towers and for the selection of the material, design, and the fabrication of the tower internals.

Figure 2:
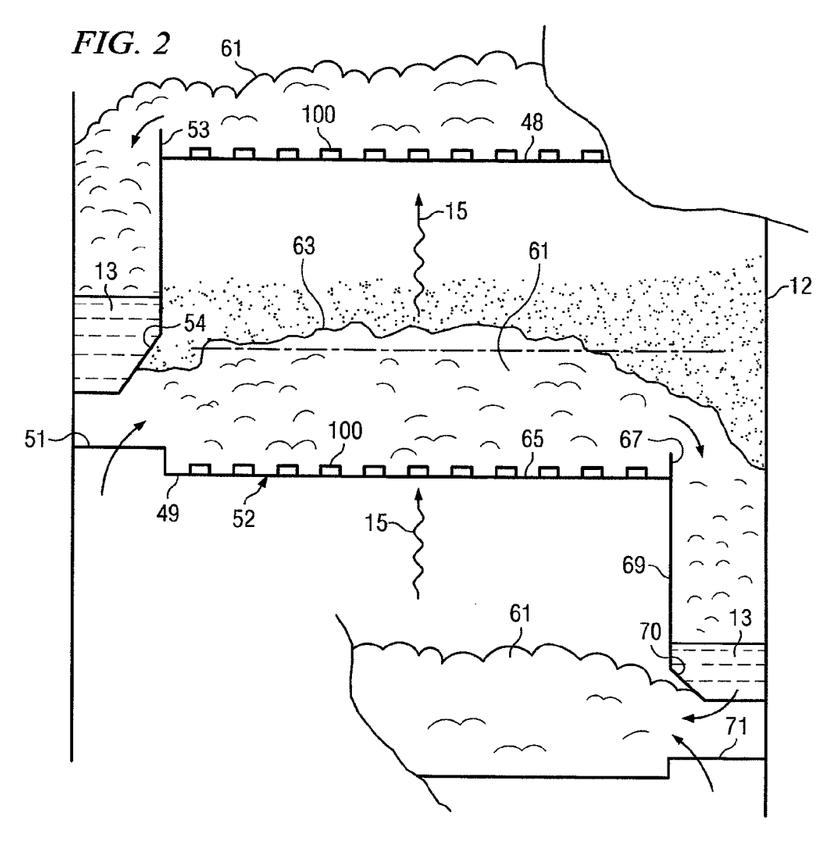
FIG. 2 illustrates a diagrammatic, side-elevational, cross-sectional view of a downcomer-tray assembly secured within a process tower and illustrating the flow of heavier fluid and lighter fluid thereacross in accordance with an embodiment of the present invention.

FIG. 2 illustrates a side-elevational, cross-sectional, diagrammatic view of the trays 48 and 49 of FIG. 1. An upper tray 48 comprises a first valved panel. The lower tray 49 is also of generally planar construction across its central active area 52, having a plurality of valves 100 mounted thereon, disposed therein, or formed therefrom as diagrammatically shown. Heavier fluid 13 travels down a downcomer 53 having a straight, sloped, tapered or mitered bottom section 54, from tray 48 disposed thereabove. The tapered section 54 of the downcomer provides a clearance angle for lighter fluid flow from the active inlet area, which clearance angle affords a horizontal flow vector to the lighter fluid vented through a flat or raised panel 51. The heavier fluid 13 engages lighter fluid 15 discharged from the active panel area 51 beneath the downcomer 53.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a lower region 70 where the heavier fluid accumulates and disperses upon active inlet region 71 thereabeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable to multiple downcomer configurations, wherein the downcomers and raised, active inlet areas may be positioned in intermediate areas of the trays as also described below. By increasing the total active area of active inlet areas 51 and 71, greater capacity and efficiency is achieved. It is also the manner of flow of the heavier fluid 13 across the tray 49 which is critical to tray efficiency.

Figure 3:
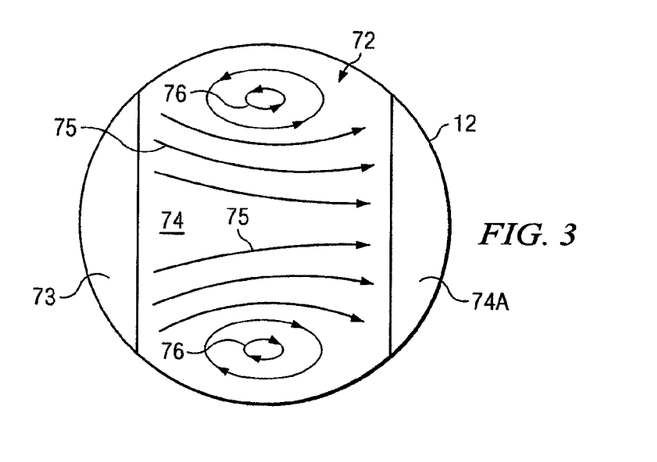
FIG. 3 illustrates a top-plan, diagrammatic view of a tray illustrating efficiency problems with fluid flow transit in accordance with an embodiment of the present invention.

FIG. 3 illustrates a flow diagram across a conventional tray. The prior art tray 72 is illustrated herein as a round unit having a first conventional downcomer for feeding heavier fluid upon an underlying panel 73 and then to the tray 74. A second downcomer 74A carries heavier fluid away from the tray. A plurality of arrows 75 illustrates the non-uniform flow of heavier fluid 13 typically observed across a conventional prior art tray which does not address the circulation issue. Circular flow is shown to be formed on both sides of the plate lateral to the direction of primary flow. The formation of these retrograde flow areas, or recirculation cells 76, decreases the efficiency of the tray. Recirculation cells 76 are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced '127 patent.

Figure 4:
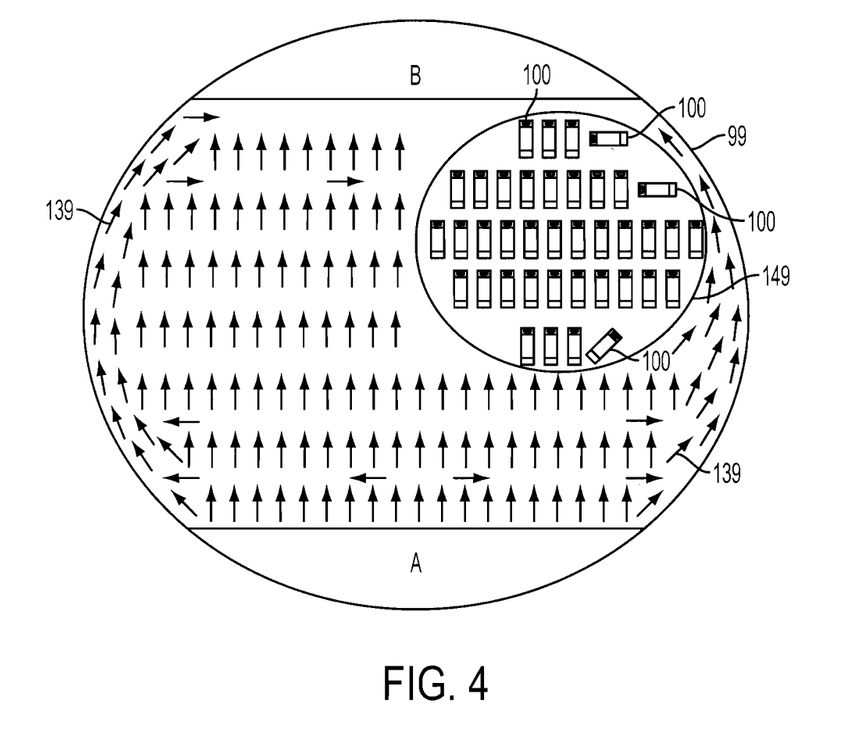
FIG. 4 illustrates a top plan view of a tray illustrating the flow of fluid transit in accordance with an embodiment of the present invention.

FIG. 4 illustrates a top plan view of a tray 99 illustrating the flow of heavier fluid 139 thereacross and the placement of a plurality of valves 100 in accordance with principles of the present invention and illustrated with oppositely disposed regions A and B for placement of downcomer sections of the type shown in above-referenced U.S. Pat. No. 5,120,474 (the '474 patent). Conventional materials such as stainless steel or other corrosion resistant material may be utilized, as is well known in the art. Each of the illustrated arrows corresponds to a direction of flow of the heavier fluid 139 as induced by one of the plurality of valves 100 that is mounted on the tray 99 at that location. For purposes of example, ones of the plurality of valves 100 are also pictorially illustrated in inset 149.

Still referring to FIG. 4, the plurality of valves 100 is shown uniformly spread across tray 99. As will be more fully described below, the plurality of valves 100 can be formed in both "fixed" and "floating" configurations. In one embodiment, the plurality of valves 100 is uniformly disposed across the entire surface of tray 99. However, various other embodiments are contemplated where the pattern of the plurality of valves 100 is staggered or varied across a single tray 99. As will be described in more detail below, the heavier fluid 139, flowing across the tray 99, encounters a lighter fluid flowing up through the plurality of valves 100 for interaction therewith. The design of the plurality of valves 100 is configured to increase the efficiency of that interaction. In various embodiments, the heavier fluid 139 may be, for example, fluid in the liquid phase and the lighter fluid may be, for example, fluid in the vapor phase.

Still referring to FIG. 4, the plurality of valves 100 is additionally shown at various orientations relative to a direction of natural flow of the heavier fluid 139 from region A to region B. Through orientation, in combination with other novel characteristics of the plurality of valves 100 to be discussed in more detail below, directional flow of the heavier fluid 139 may be induced. In some embodiments, directional flow may be induced to provide momentum in the direction of natural flow of the heavier fluid. Directional flow may also be induced in a direction that is different from the direction of natural flow. For example, along a periphery of the tray 99, a turning flow of the heavier fluid 139 is shown to be induced. By way of further example, directional flow is shown to be induced orthogonally and at other angles relative to the natural flow of the heavier fluid 139. Thus, through utilization of the valves 100, directional flow of the heavier fluid 139 may be simultaneously induced in multiple directions. One of ordinary skill in the art will recognize that many directions and angles relative to the natural flow of the heavier fluid 139 are contemplated and may be advantageous for specific applications.

Figure 5A:
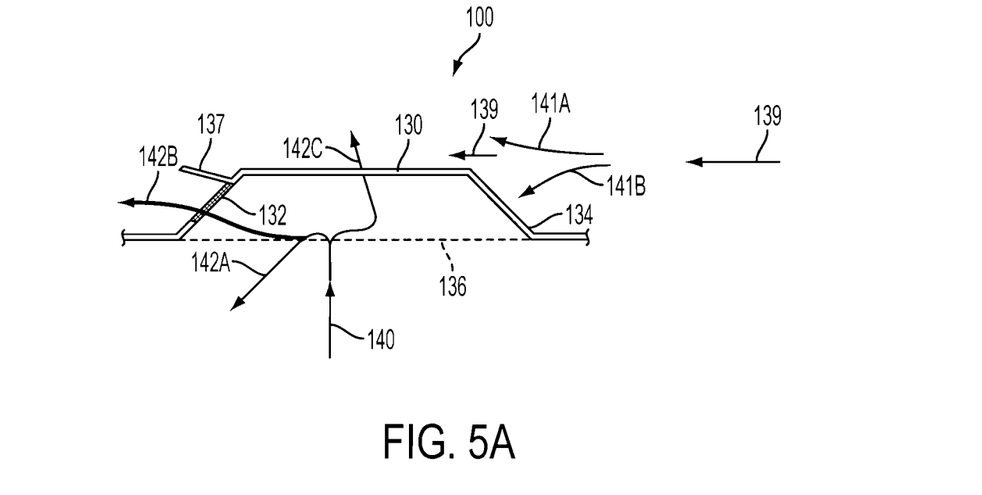
FIG. 5A illustrates an enlarged, side elevation cross-sectional view of a fixed unit of FIG. 4 in accordance with an embodiment of the present invention.
Figure 5B:
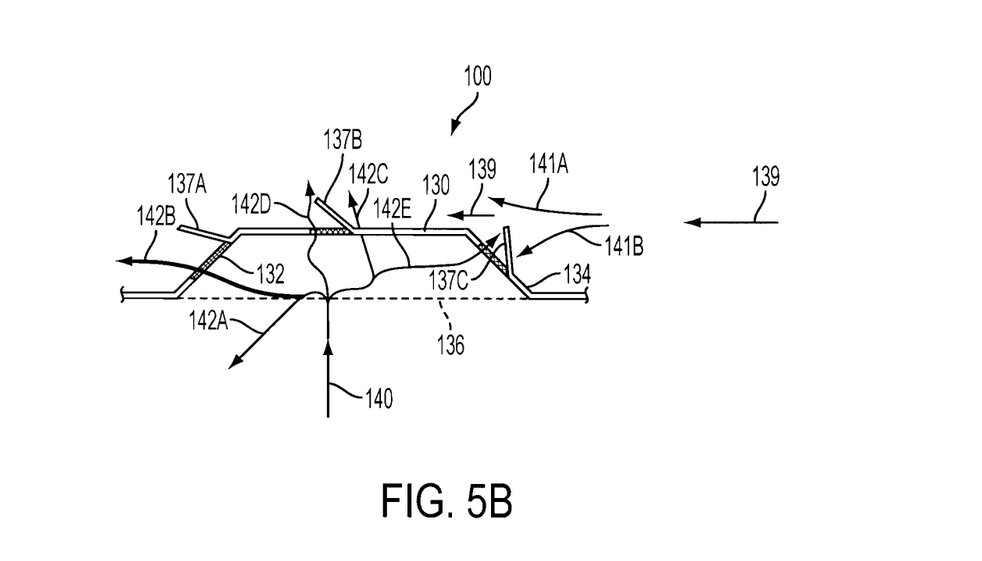
FIG. 5B illustrates an enlarged, side elevation cross-sectional view of a fixed unit of FIG. 4 in accordance with an alternate embodiment of the present invention.

FIGS. 5A-B illustrate an enlarged, side elevational cross-sectional view of a fixed valve 100 of FIG. 4 in accordance with embodiments of the present invention. The fixed valve 100 of this embodiment is comprised of a generally rectangular top surface 130 having angulated securement legs 132 and 134 depending therefrom. The fixed valve 100 is fixedly mounted or formed within the surface of tray 99 and disposed above an aperture 136 formed therein. The orientation of the fixed valve 100 relative to the fluid flow is shown by arrow 139.

Referring to FIG. 5A, it may be seen that the fixed valve 100 of the present invention includes a deflector tab 137 formed in the downstream leg 132 thereof relative to fluid flow 139. The deflector tab 137 not only deflects the flow of heavier fluid 139 across the tray 99 but also assists the momentum of the heavier fluid velocity by creating a deflector path for the rising lighter-fluid 142B ingressing in the same general direction as the heavy fluid flow 139. The size of the fixed valve 100 has been shown to be effective to date in the assembly of a tray having an active area with approximately 25-50 valves per square foot. Other sizes are, of course, contemplated by the present invention. The deflector tab 137 controls a final injection angle as compared to many prior art embodiments which inject the light fluid in a direction essentially orthogonal to the direction of heavy fluid flow. The present invention is thus a marked advance over many prior art designs. The exemplary embodiment as illustrated in FIG. 5A includes only one deflector tab 137; however, according to an alternate embodiment as illustrated in FIG. 5B, multiple deflector tabs 137A-C are shown. According to FIG. 5B, deflector tabs 137A-C may also be formed in the generally rectangular top surface 130 and/or in the upstream leg 134. According to alternate embodiments, tabs 137 may be located at several other locations for different purposes. The light fluid kinetic energy is thus controlled to produce the desired heavy fluid vector results.

Still referring to FIGS. 5A-B, heavier-fluid flow is illustrated with arrow 139. As the heavier-fluid flow 139 engages the upstream leg member 134 of the fixed valve 100, it is seen to partially split into tri-directional flow 141A and 141B traveling around the aperture 136; and 139 continuing over the generally rectangular top surface 130. Lighter fluid 140 venting beneath the fixed valve 100 is represented by arrows 142A, 142B, 142C, 142D, and 142E, which arrows illustrate the biased direction that the lighter fluid 140 has in discharge from beneath the valve 100. More particularly, it is shown in FIG. 5A how the heavier-fluid flow 139 interacts efficiently with the lighter-fluid flow 140 due to the deflector tab 137 formed in the fixed valve 100. As shown herein and as described above, the fixed valve 100 is constructed with the deflector tab 137 which deflects heavy fluid flow 139 and controls the final injection angle of the lighter fluid 140. The enhanced interaction between the lighter-fluid flow 140 and the heavier fluid flow 139 is a key element in improved efficiency. The deflector tab 137 may also be formed in a variety of shapes, angles, holes, sizes, and quantities.

Referring now to FIG. 5A, it may be seen that the orientation of the fixed valve 100 and the deflector tab 137 induces the lighter fluid flow 142B to be in a direction substantially along the path of the heavier fluid flow 139 to further promote the directional flow of heavier fluid 139. It should be noted that a "deflection tab turbulence" aspect of the fixed valve 100 further enhances the heavier fluid/lighter fluid interaction. The deflector tab 137 causes interruption in the flow of heavy fluid 139 to assist the injection and mixing of lighter fluid 140 therewith.

Figure 6A:
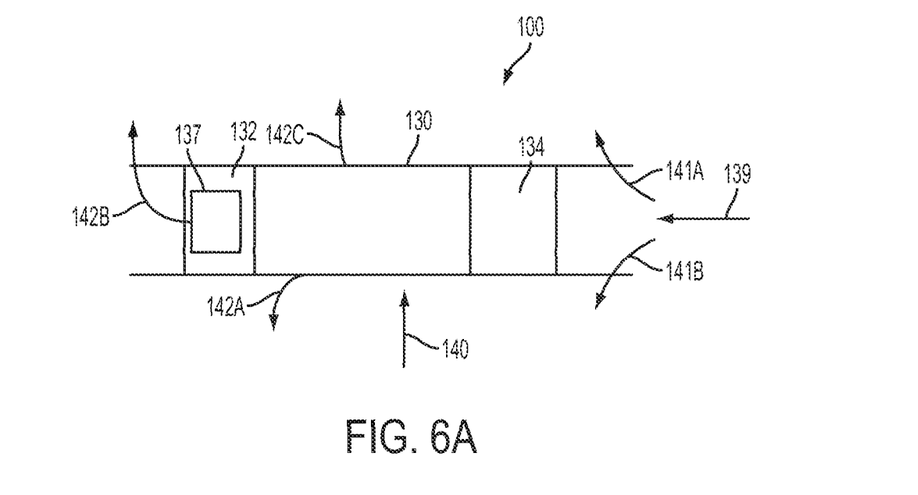
FIG. 6A illustrates a top plan view of the fixed unit structure of FIG. 5A in accordance with an embodiment of the present invention.

FIG. 6A illustrates a top plan view of the fixed valve 100 of FIG. 5A in accordance with an embodiment of the present invention. The upstream leg member 134 engages heavier-fluid flow 139 coming across the tray 99. Lighter fluid 140 ascending through the tray deck 99 is exhausted as represented by arrows 142A, 142B, and 142C. The escaping lighter fluid of arrows 142A through 142C interacts immediately with heavier fluid flow 139 and continues downstream of the leg member 132 having the deflector tab 137 formed therein. It should be noted that the deflector tab 137 not only deflects the flow of heavier fluid 139 across the tray 99 but also assists the momentum of the heavier fluid velocity by creating a deflector path for the rising lighter-fluid 140 ingressing in the same general direction as the heavy fluid flow 139.

Figure 6B:
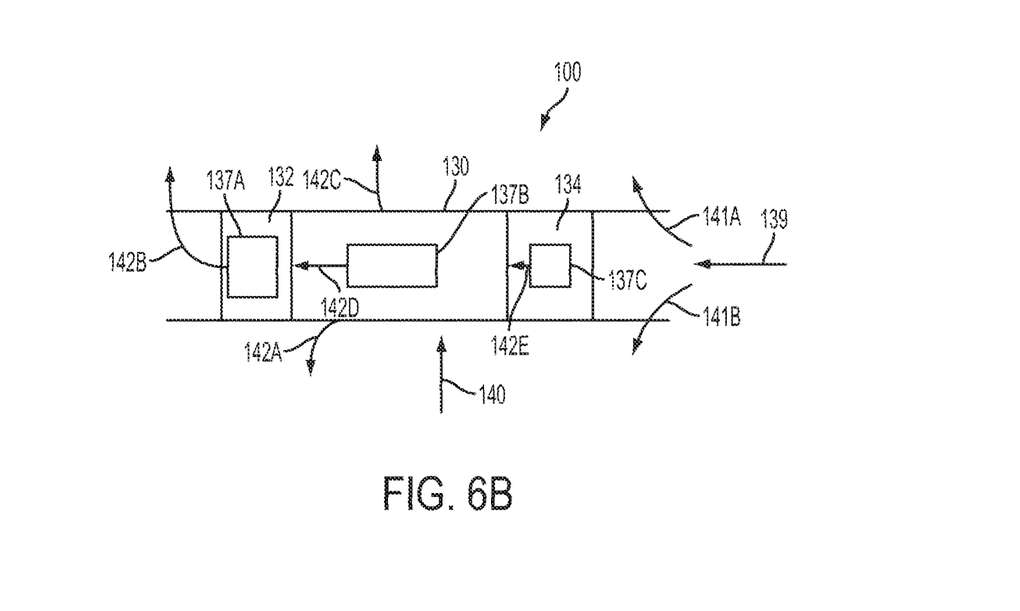
FIG. 6B illustrates a top plan view of the fixed unit structure of FIG. 5B in accordance with an alternate embodiment of the present invention.

FIG. 6B illustrates a top plan view of the fixed valve 100 of FIG. 5B in accordance with an embodiment of the present invention. The upstream leg member 134 engages heavier-fluid flow 139 coming across the tray 99. Lighter fluid 140 ascending through the tray deck 99 is exhausted as represented by arrows 142A, 142B, 142C, 142D, and 142E. The escaping lighter fluid of arrows 142A through 142E interacts immediately with heavier fluid flow 139 and continues downstream of the leg member 132 having the deflector tab 137A formed therein. It should be noted that the deflector tabs 137A-C not only deflects the flow of heavier fluid 139 across the tray 99 but also assists the momentum of the heavier fluid velocity by creating a deflector path for the rising lighter-fluid 140 ingressing in the same general direction as the heavy fluid flow 139.

Figure 7:
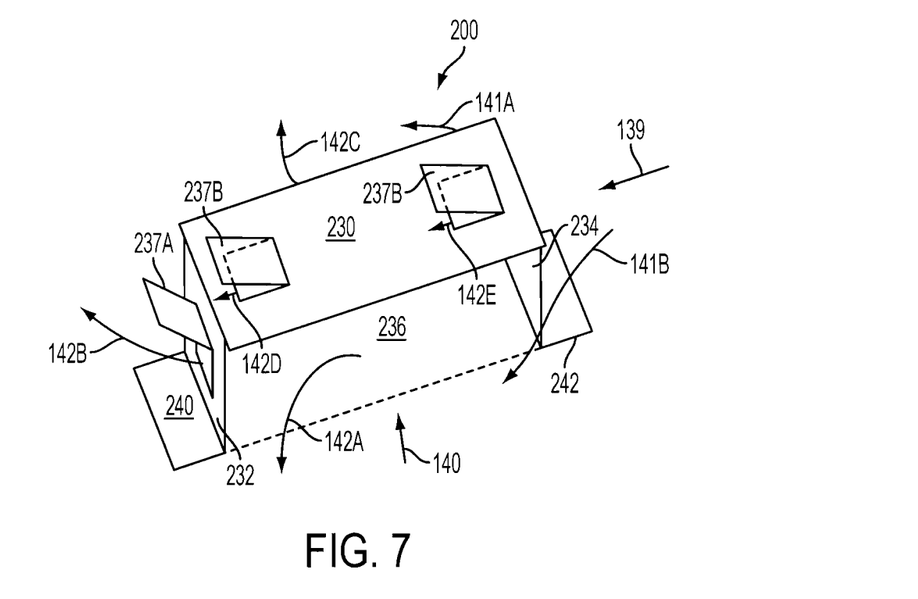
FIG. 7 illustrates an enlarged perspective view of a floating unit in accordance with an embodiment of the present invention.

FIG. 7 illustrates an enlarged perspective view of a floating valve 200 in accordance with an embodiment of the present invention. In this embodiment, the floating valve 200 acts as a deflecting plate that deflects impinging fluid-flow across the tray 99 in order to disperse rising lighter fluid 140 coming through the tray 99 into the heavier fluid stream 139 thereacross and is disposed in a generally rectangular aperture in the tray surface of FIG. 4. The floating valve 200 is, in this embodiment, a separate structure inserted into tray 99. The floating valve 200 comprises securement legs 232 and 234 depending from a generally rectangular top surface 230. As shown, deflector tab 237A is formed on the securement leg 232 and two deflector tabs 237B are formed on the generally rectangular top surface 230.

According to an exemplary embodiment, the generally rectangular top surface 230 of the floating valve 200 is wider than an aperture 236 formed within the tray 99. The wider top 230 of the floating valve 200 prevents the floating valve 200 from passing through the aperture 236. According to an exemplary embodiment, the securement leg 232 further comprises a generally rectangular tab 240 integrally connected to an end of the leg 232. The securement leg 234 further comprises a generally rectangular tab 242 integrally connected to an end of the leg 234. The generally rectangular tabs 240 and 242 secure the floating valve 200 to the tray 99. The shape of securement legs 232 and 234 as illustrated in FIG. 7 is exemplary and other shapes and sizes may be utilized according to alternate embodiments. According to alternate embodiments, various means for valve retention may be utilized such as, for example, a separate retainer-cage mechanism having a separate floating disc as the valve.

Still referring to FIG. 7, as the heavier-fluid flow 139 engages an upstream leg member 234 of the floating valve 200, it is seen to partially split into tri-directional flow 141A and 141B traveling around the aperture 236; and 139 continuing over the generally rectangular top surface 230. Lighter fluid 140 ascending through the tray deck 99 is exhausted as represented by arrows 142A, 142B, 142C, 142D, and 142E. More particularly, it is shown in FIG. 7 how the heavier-fluid flow 139 interacts efficiently with the lighter-fluid flow 140 due to the deflector tab 237A formed in the securement leg 232 and the deflector tabs 237B formed in the generally rectangular top surface 230.

Figure 8:
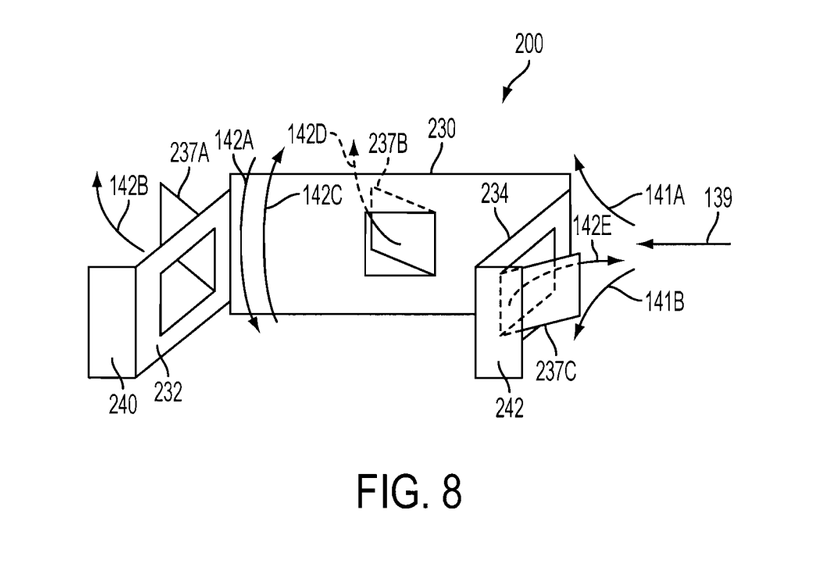
FIG. 8 illustrates a perspective view of an underneath side of an alternative embodiment of the floating unit of FIG. 7.

FIG. 8 illustrates a perspective view of an underneath side of an alternative embodiment of the floating valve 200. FIG. 8 further illustrates a fabrication of the floating valve 200 and its configuration prior to placement of the valve 200 within the tray surface aperture. The upstream leg member 234 engages heavier-fluid flow 139 coming across the tray 99. Lighter fluid 140 ascending through the tray deck 99 is exhausted as represented by arrows 142A, 142B, 142C, 142D, and 142E. The escaping lighter fluid of arrows 142A through 142E interacts immediately with heavier fluid flow 139 and continues downstream of the leg member 232 having the deflector tab 237A formed therein. It should be noted that the deflector tabs 237A-C not only deflect the flow of heavier fluid 139 across the tray 99 but also assist the momentum of the heavier fluid velocity by creating a deflector path for the rising lighter-fluid 140 ingressing in the same general direction as the heavy fluid flow 139.

In summary, this patent application is provided to further teach the utilization of both fixed and floating valves in a contact tray assembly that is designed to enhance lighter fluid/heavier fluid interaction utilizing a multiplicity of valve and unit configurations. The contact trays may have a plurality of valves and tabs of a multitude of shapes. The plurality of valves may have tabs of varying angles in order to control the final injection angle. According to exemplary embodiments, the tabs maybe of various shapes such as, for example, rectangular, round and the like. In addition, according to various embodiments, the plurality of valves may be oriented at various angles relative to the natural flow of the heavier fluid. Although exemplary embodiments illustrate inducing directional flow in the direction of the natural flow of the heavier fluid, it is contemplated that directional flow may be induced in one or multiple directions as depicted, for example, in FIG. 4. Furthermore, although exemplary embodiments depict valves with substantially rectangular top surfaces, according to various embodiments, the plurality of valves may be formed in a variety of shapes. For example, it is contemplated that top surfaces of ones of the plurality of valves may be round or trapezoidal, which valve top surface shapes are disclosed in U.S. patent application Ser. No. 12/109,781, incorporated herein by reference. Other shapes, such as triangular, are also contemplated and will be apparent to one of ordinary skill in the art.

It is thus believed that the operation and construction of the present invention will be apparent from the foregoing description. For the method and apparatus shown or described has been characterized as being preferred it will be obvious that various changes and modifications may be made therein without departing from the spirit and scope of the invention as defined in the following claims.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A tray valve assembly for a process column of a type wherein a first, heavier fluid flows downwardly from a downcomer onto a tray and thereacross in a first direction through which a second, lighter fluid flows upwardly therethrough for interaction and mass transfer with the first, heavier fluid before passing therefrom, the tray valve assembly comprising:
   a plurality of tray apertures formed on a surface of the tray for facilitating the second, lighter fluid flow upwardly therethrough;
   a plurality of floating valves disposed across the surface of the tray and mounted in association with the plurality of tray apertures formed on the surface of the tray, at least one floating valve of the plurality of floating valves comprising:
      a top surface;
      an upstream securement leg coupled to the top surface;
      a downstream securement leg coupled to the top surface;
      at least one floating valve aperture formed in the downstream securement leg to facilitate the second, lighter fluid flow therefrom;
      a deflector tab disposed with the at least one valve aperture, the deflector tab being pivoted outwardly from the downstream securement leg until the deflector tab is at least substantially parallel with the top surface, the deflector tab being pivoted about an upper edge of the at least one valve aperture; and
   the deflector tab and an orientation of the at least one floating valve on the tray allowing the second, lighter fluid to be injected into the first, heavier fluid passing over the at least one valve aperture for inducing a turning flow of the first, heavier fluid.

2. The tray valve assembly of claim 1, wherein the at least one valve is adapted to induce the turning flow of the first, heavier fluid to a less-irrigated portion of the tray.

3. A tray valve assembly for a process column of a type wherein a first, heavier fluid flows downwardly from a downcomer onto a tray and thereacross in a first direction through which a second, lighter fluid flows upwardly therethrough for interaction and mass transfer with the first, heavier fluid before passing therefrom, the tray valve assembly comprising:
   a plurality of tray apertures formed on a surface of the tray for facilitating the second, lighter fluid flow upwardly therethrough;
   a plurality of floating valves disposed across the surface of the tray and mounted in association with the plurality of tray apertures formed on the surface of the tray, at least one floating valve of the plurality of floating valves comprising:
      a top surface;
      an upstream securement leg coupled to the top surface;
      a downstream securement leg coupled to the top surface;
      at least one valve aperture formed in the downstream securement leg to facilitate the second, lighter fluid flow therefrom; and
      a deflector tab disposed with the at least one valve aperture and being pivoted outwardly from the downstream securement leg until the deflector tab is at least substantially parallel with the top surface, the deflector tab being pivoted about an upper edge of the at least one valve aperture; and
   the deflector tab and an orientation of the at least one floating valve on the tray allowing the second, lighter fluid to be injected into the first, heavier fluid passing over the at least one valve aperture for simultaneously inducing directional flow of the first, heavier fluid in at least two directions.

4. The tray valve assembly of claim 3, wherein the at least two directions comprise distinct directions oriented between 0 and 180 degrees relative to the first direction.

5. The tray valve assembly of claim 4, wherein the at least two directions comprise a direction substantially parallel to the first direction.

6. The tray valve assembly of claim 4, wherein the at least two directions comprise a direction inducing a turning flow.

7. The tray valve assembly of claim 5, wherein the at least two directions comprise a direction substantially orthogonal to the first direction.

* * * * *